US012801587B2

(12) United States Patent
Weisman et al.

(10) Patent No.: US 12,801,587 B2
(45) Date of Patent: Nov. 17, 2026

(54) REUSABLE DATA PROCESSING PROGRAM GENERATION

(71) Applicant: Ab Initio Technology LLC, Lexington, MA (US)

(72) Inventors: Amit Weisman, Bedford, MA (US); Molly Pribble, Somerville, MA (US); Avery Keare, Pacific Palisades, CA (US); Dirk Stahlecker, Cambridge, MA (US); Victor T. Abaya, Bedford, MA (US); Carl Angiolillo, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 8 days.

(21) Appl. No.: 18/633,887

(22) Filed: Apr. 12, 2024

(65) Prior Publication Data

US 2024/0411747 A1 Dec. 12, 2024

Related U.S. Application Data

(60) Provisional application No. 63/472,445, filed on Jun. 12, 2023.

(51) Int. Cl.
*G06F 16/23* (2019.01)

(52) U.S. Cl.
CPC ................................ *G06F 16/2365* (2019.01)

(58) Field of Classification Search
CPC ............. G06F 18/211; G06F 18/24323; G06F 18/213; G06F 18/24; G06F 18/22; G06F 16/9024; G06F 16/54; G06F 16/538; G06F 16/535; G06F 16/24; G06N 20/00; G06N 3/08; H04L 9/0643; H04L 9/0836
USPC ....... 707/602, 608, 700, 705, 733, 734, 756, 707/784, 798, 805, 17.081, 17.067, 707/17.138, 17.059, 17.011, 17.016, 707/17.03
See application file for complete search history.

(56) References Cited

U.S. PATENT DOCUMENTS 10,956,132 B1 * 3/2021 Schneider ................. G06F 8/40
2003/0182286 A1 * 9/2003 Seccuro .................. G06F 16/95 707/999.009
2006/0294150 A1 * 12/2006 Stanfill ...................... G06F 8/51
2010/0057618 A1 * 3/2010 Spicer ................. G06F 3/04815 715/848
2012/0158548 A1 * 6/2012 Conlon .............. G06Q 30/0641 705/27.1
2017/0315979 A1 * 11/2017 Boucher ............... G06F 3/0482
2018/0095653 A1 * 4/2018 Hasek ................. G06F 3/04883
2018/0103038 A1 * 4/2018 Burke ................. G06F 16/9038
2018/0144067 A1 * 5/2018 Chatelain .............. G06F 16/164
2018/0276226 A1 * 9/2018 Knight .................. H04L 67/306
2019/0043201 A1 * 2/2019 Strong ................... G06V 10/96
2019/0045207 A1 * 2/2019 Chen ..................... G06F 16/951
2020/0412767 A1 * 12/2020 Crabtree ............. H04L 63/1441
(Continued)

*Primary Examiner* — Tony Mahmoudi
*Assistant Examiner* — Linh Black
(74) *Attorney, Agent, or Firm* — Young Basile Hanlon & MacFarlane, P.C.

(57) ABSTRACT

A method for developing a reusable data processing program including a set of data transformation steps by displaying a set of records and iteratively enabling a user to select one or more data transformation steps, iteratively applying the data transformation steps to the records, and iteratively displaying the transformed records.

29 Claims, 15 Drawing Sheets

(56) References Cited

U.S. PATENT DOCUMENTS

| | | | |
|---|---|---|---|
| 2021/0232579 | A1 | 7/2021 | Schechter et al. |
| 2022/0147529 | A1 | 5/2022 | Egenolf et al. |
| 2022/0342935 | A1 | 10/2022 | Egenolf et al. |

* cited by examiner

100

| | 102 Total frequent flyer miles | 104 Current year frequent flyer miles | 106 Class of seat | 108 Row of seat | 112 Boarding Group |
|---|---|---|---|---|---|
| 110a | >= 1,000,000 | | | | 1 |
| 110b | | | first | | 1 |
| 110c | >= 100,000 | >= lat year frequent flyer miles | | | 2 |
| 110d | | | business | | 2 |
| 110e | | | else | <= 10 | 2 |
| 110f | | | same | <= 40 | 3 |
| 110g | | | same | <= 50 | 4 |
| 110h | | | same | else | 5 |

REUSABLE DATA PROCESSING PROGRAM GENERATION

CROSS-REFERENCE TO RELATED APPLICATIONS

This application claims the benefit of U.S. Provisional Application No. 63/472,445 filed Jul. 12, 2023, the content of which is incorporated herein in its entirety.

BACKGROUND OF THE INVENTION

This invention relates to the generation of a reusable data processing program based on a user's manipulation of a tabular representation of data.

Complex computations can be expressed as a data flow through a directed graph, with components of the computation being associated with the vertices of the graph and data flows between the components corresponding to links (arcs, edges) of the graph. In some cases, the computations associated with a component are described in human-readable form referred to as "business rules." Business rules include a set of criteria used to transform data from one format to another, make determinations about data, or generate new data based on a set of input data.

Referring to FIG. 1, in one paradigm for developing a data transformation using business rules, a tabular user interface 100 simplifies the development process for less technical users. The user interacts with the tabular user interface 100 to specify conditions 110*a*-110*h* (e.g., inequalities or computations) that are applied to input fields 102, 104, 106, 108 of an input record. In an output field 112, the user associates an output value with each condition. The conditions are applied to the input record in an order from the first condition 110*a* to the last condition 110*h*, and an output value associated with a condition that is satisfied first is output from the business rule. Within the user interface, the user can easily apply the business rule to an input record to iteratively test and adjust the business rule's functionality.

Referring to FIG. 2, when the user is satisfied with their business rule 113, the rule is compiled using a generator 114 to generate a transform 116. The transform 116 is ultimately used as a component in an executable dataflow graph 118 executed in a graph-based computation system. Further details of business rule development paradigm can be found in U.S. Pat. No. 8,069,129.

In some examples, dataflow graphs are executable computer programs that include vertices (representing data processing components or datasets) connected by directed links (representing flows of work elements, i.e., data) between the vertices. For example, such an environment is described in more detail in U.S. Pat. No. 7,716,630, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes). A dataflow graph as referred to herein, is an executable computer program.

SUMMARY OF THE INVENTION

While the business rule development paradigm described above uses a tabular user interface to provide a user with a comprehensive view of the different conditions defining a business rule, the tabular user interface does not provide an overall view of the transformed records that result from applying the business rule to a set of input records.

Aspects described herein relate to an alternative and improved paradigm for defining a transformation based on user manipulation of data records in a tabular user interface. Data records are displayed to the user in a tabular user interface. The user's manipulations of the data records in the tabular user interface (e.g., adding or removing columns, filtering the data records, and defining computations based on the data records) are aggregated and together form an aggregate transformation. What the user sees in the tabular interface is an up-to-date representation of a set of input records as transformed by the aggregate transformation. When the user is satisfied with the transformed data records displayed in the tabular user interface, they can export the aggregate transformation (sometimes referred to as a set of "final transformations") as a reusable data processing program for processing other input data.

In a general aspect, a method for developing a reusable data processing program including a set of data transformation steps by displaying a set of records and iteratively enabling a user to select one or more data transformation steps, iteratively applying the data transformation steps to the records, and iteratively displaying the transformed records includes accessing a number of input records, rendering a representation of the number of transformed records in a user interface, the number of transformed records determined by applying the set of data transformation steps to the number of input records, and receiving first user input as the user manipulates the representation of the number of transformed records using the user interface, the first user input including one or more data transformation steps. For each data transformation step of the one or more data transformation steps, the method includes adding the data transformation step to the set of data transformation steps, updating the number of transformed records, including applying the set of data transformation steps to the number of input records, and rendering a representation of the transformed number of transformed records in the user interface. The method further includes receiving second user input causing export of the reusable data processing program based at least in part on the set of data transformation steps, the reusable data processing program being applicable to one or more pluralities of records different from the number of input records.

Aspects may include one or more of the following features.

The set of data transformation steps may include a number of data transformation steps. The number of data transformation steps may be applied sequentially according to an order specified by the user. The method may include rendering a representation of the set of data transformation steps in the user interface during development of the reusable data processing program. The representation of the set of data transformation steps may display the data transformation steps in a list ordered according to the order specified by the user. The representation of the set of data transformation steps may include a dataflow graph representation of the data transformation steps. The method may include receiving third user input causing removal of one or more data transformation steps from the set of data transformation steps. The method may include receiving third user input causing modification of one or more data transformation steps from the set of data transformation steps.

The user interface may include a tabular interface and the representation of the number of transformed records is rendered in the tabular interface. The user interface may include a list interface where the set of data transformation steps is rendered as a list in the list interface. The set of data transformation steps rendered in the list interface may be ordered according to an order of application of the data transformation steps to the number of input records. The method may include receiving third user input to change the order of application of the set of data transformation steps. The method may include interacting with a data transformation step using the list interface to modify the data transformation step. The method may include interacting with a data transformation step using the list interface to remove the data transformation step from the set of data transformation steps.

The set of data transformation steps may include one or more of a filter data transformation step, an add field data transformation step, and a choose fields data transformation step. The set of data transformation steps may include a filter data transformation step. Causing export of the reusable data processing program may include compiling the set of data transformation steps to form the reusable data processing program. Causing export of the reusable data processing program may include forming a dataflow graph representation of the set of data transformation steps to form the reusable data processing program.

The method may include computing a data profile for the number of transformed records and rendering a representation of the data profile in the user interface. The second user input may be received upon determining that a data profile for the number of transformed records is in accordance with a predetermined data profile.

The predetermined data profile or predetermined profile rule may specify an allowable range for some characteristics of the data profile. The method may include computing a data quality for the number of transformed records and rendering a representation of the data quality in the user interface. The data quality may include at least one of counts of valid values, invalid values, NULL values, distinct values, unique values, and/or maximum and minimum values.

In another general aspect, a system for developing a reusable data processing program including a set of data transformation steps by displaying a set of records and iteratively enabling a user to select one or more data transformation steps, iteratively applying the data transformation steps to the records, and iteratively displaying the transformed records includes a first input for accessing a number of input records, an output for rendering a representation of the number of transformed records in a user interface, the number of transformed records determined by applying the set of data transformation steps to the number of input records, and a second input for receiving first user input as the user manipulates the representation of the number of transformed records using the user interface, the first user input including one or more data transformation steps. The system includes one or more processors configured to, for each data transformation step of the one or more data transformation steps, perform the steps of adding the data transformation step to the set of data transformation steps, updating the number of transformed records, including applying the set of data transformation steps to the number of input records, and rendering a representation of the transformed number of transformed records in the user interface. The system further includes a third input for receiving second user input causing export of the reusable data processing program based at least in part on the set of data transformation steps, the reusable data processing program being applicable to one or more pluralities of records different from the number of input records.

In another general aspect, a non-transitory computer-readable medium stores instructions for causing a computing system to implement a method for developing a reusable data processing program including a set of data transformation steps by displaying a set of records and iteratively enabling a user to select one or more data transformation steps, iteratively applying the data transformation steps to the records, and iteratively displaying the transformed records. The instructions cause the computing system to access a number of input records, render a representation of the number of transformed records in a user interface, the number of transformed records determined by applying the set of data transformation steps to the number of input records, and receive first user input as the user manipulates the representation of the number of transformed records using the user interface, the first user input including one or more data transformation steps. For each data transformation step of the one or more data transformation steps, the instructions causes the computing system to add the data transformation step to the set of data transformation steps, update the number of transformed records, including applying the set of data transformation steps to the number of input records, and render a representation of the transformed number of transformed records in the user interface. The instructions further cause the computing system to receive second user input causing export of the reusable data processing program based at least in part on the set of data transformation steps, the reusable data processing program being applicable to one or more pluralities of records different from the number of input records.

In another general aspect, a system for developing a reusable data processing program including a set of data transformation steps by displaying a set of records and iteratively enabling a user to select one or more data transformation steps, iteratively applying the data transformation steps to the records, and iteratively displaying the transformed records includes means for accessing a number of input records, means for rendering a representation of the number of transformed records in a user interface, the number of transformed records determined by applying the set of data transformation steps to the number of input records, means for receiving first user input as the user manipulates the representation of the number of transformed records using the user interface, the first user input including one or more data transformation steps, and means for processing configured to, for each data transformation step of the one or more data transformation steps add the data transformation step to the set of data transformation steps, update the number of transformed records, including applying the set of data transformation steps to the number of input records, and render a representation of the transformed number of transformed records in the user interface. The system also includes means for receiving second user input causing export of the reusable data processing program based at least in part on the set of data transformation steps, the reusable data processing program being applicable to one or more pluralities of records different from the number of input records.

In another general aspect, a method for developing a reusable data processing program includes accessing a number of input records, rendering a representation of the number of input records in one or more user interfaces, receiving a set of one or more data transformation steps, applying the set of data transformation steps to the number of input records to obtain a number of transformed records, rendering a representation of the number of transformed records in the one or more user interfaces, receiving first user input as the user manipulates the representation of the number of transformed records using the one or more user interfaces, the first user input including one or more data transformation steps. For each data transformation step of the one or more data transformation steps of the first user input, the method adds the data transformation step to the set of data transformation steps to update the set of data transformation steps, updates the number of transformed records, including applying the updated set of data transformation steps to the number of input records to obtain an updated number of transformed records, and renders a representation of the updated number of transformed records in the one or more user interfaces. The method further includes receiving second user input causing export of the reusable data processing program, said exported program being based at least in part on the updated set of data transformation steps, the reusable data processing program being applicable to one or more pluralities of records different from the number of input records.

Among other advantages, aspects advantageously provide a graphical shortcut for making settings in data transformations, to instruct a computer to transform data records in a particular way. This graphical shortcut can involve a tabular user interface for developing and/or adjusting complex transforms for data processing programs. The graphical shortcut allows one to choose data processing conditions, such as directly via the tabular form in which the records are displayed, without having to cycle through the code of the transform every time a transform step needs to be changed, added, or removed. This saves computing resources and makes the performing of the change, addition, or removal of the transform step efficient and reliable.

Furthermore, aspects save time and computing resources while ensuring proper execution of the resulting data processing program. For example, providing an environment for developing rules in a tabular interface advantageously lets the user see the result of applying the rules to data in real time. This can make more efficient use of computing resources because seeing results helps users immediately recognize errors in their code without resorting to trial and error, which can be computationally wasteful. A tighter feedback cycle between making edits and seeing results can help users catch logic and conceptual errors much more quickly. In some aspects, the interface works on a subset of data (e.g., 500 records) so the logic may run more often to provide user feedback and a tighter feedback loop, but it also runs on small datasets that are cached during a session to reduce extraction costs from the source system (e.g., a cloud provider such as Amazon S3 is paid only once for the ready data, not once per edit). Some aspects also optimize the data processing program by, for example, merging steps, pushing down logic to the source system, and reordering logic to be more efficient.

Aspects also advantageously ensure that proper execution of the resulting data processing program is more likely. Software testing and debugging is a difficult problem—even the most well-developed software includes bugs. Aspects described herein provide a view of the output data as the software is developed, facilitating the quick and easy discovery of errors in the software (i.e., based on visual inspection, the user knows almost immediately that the output data is different from what they expected). As a result, software developed using the invention is more likely to have error-free execution. That is, the interface provides a powerful debugging tool, where the tabular interface acts like a probe in a debugger, presenting results that help users intuitively recognize and resolve errors in the data processing program.

Some aspects advantageously obviate the need for a user to manually build a dataflow graph. Building of the dataflow graph is done behind the scenes, so the user doesn't have to spend time and waste computing resources configuring the layout of the dataflow graph. This amounts to a graphical shortcut, where program development in the tabular view significantly reduces the processing load on the underlying computing hardware (e.g., by reducing graphical processing load from dragging and dropping components, wiring components together, rearranging components, switching between development views and runtime views, etc.).

Yet other aspects guide users to reduce erroneous manipulation of the tabular representation of data, to reduce errors in the transforms, and to obtain a resulting data processing program that is more likely to be executable and properly applied to data records. The tabular view is a constrained programming environment that, by its very nature, aims to reduce the number of ways a user could introduce errors into the program. Compared to spreadsheet programs aspects operate on semantically meaningful concepts like "data fields" rather than interface elements like "spreadsheet cells". Among other benefits, this prevents a class of error that arises in spreadsheets when a formula is not replicated correctly between cells (not to mention saving the effort of having to replicate formulas into many cells). For example, a spreadsheet formula might use a relative reference when it should use an absolute one or vice versa, or a formula might not have been copied properly onto inserted rows. Furthermore, showing test data while expressions/transformations are being constructed can also help catch logic errors without waiting to run the expressions/transformations on the full dataset.

Per-field profiling could also be used to catch some classes of logic errors that arise from misconceptions about input data. For example, helping the user notice that a numeric value is probably from a constrained set of values so that someone doesn't attempt to perform mathematical operations on it. That type of information might not be immediately obvious from seeing the first few dozen values, but the data profile would make that clear.

Being able to test transformations on very large datasets also advantageously facilitates the identification of outliers in results. Local spreadsheets run into performance issues when run on extremely large datasets so in practice users write formulas in smaller spreadsheet files and then migrate them to larger ones, whereas the transformations described herein are implemented in graphs and can be applied to the dataset from the beginning.

Other features and advantages of the invention are apparent from the following description and from the claims.

DETAILED DESCRIPTION

1 Overview

Figures 1, 2:
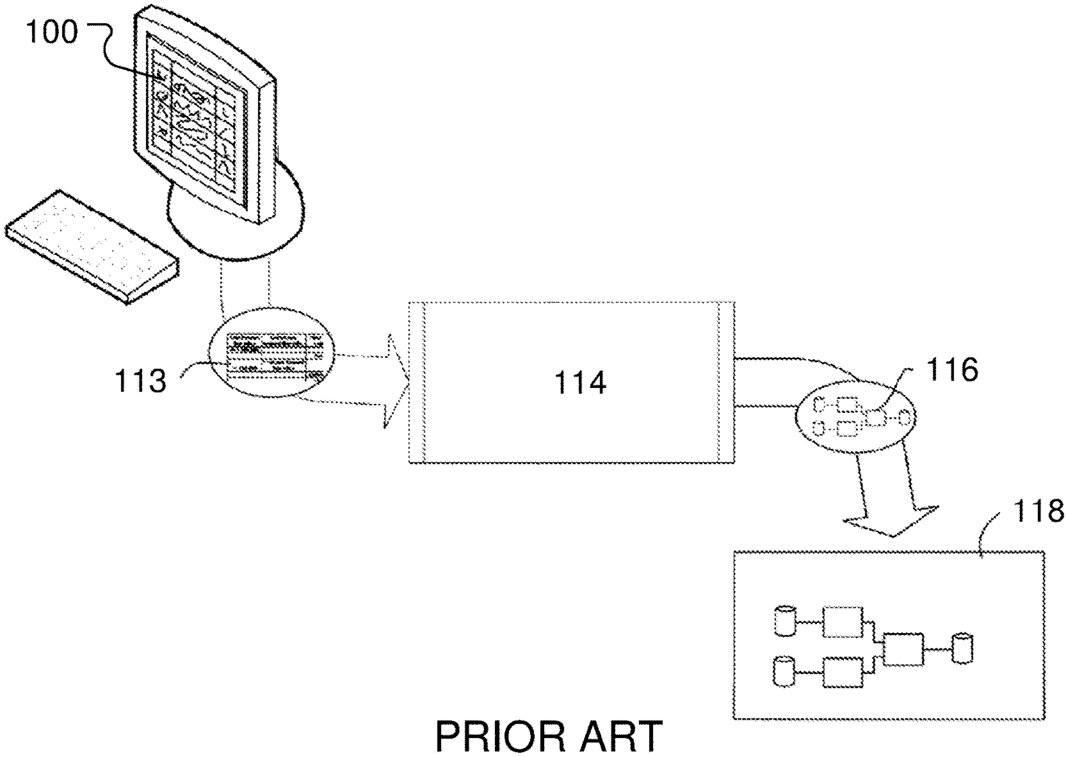
PRIOR ART FIG. 1
PRIOR ART FIG. 2
FIG. 1 is a prior art user interface for developing business rules.
FIG. 2 is a prior art process for compiling a business rule developed using the user interface of FIG. 1 for use in a data processing system.
Figure 3:
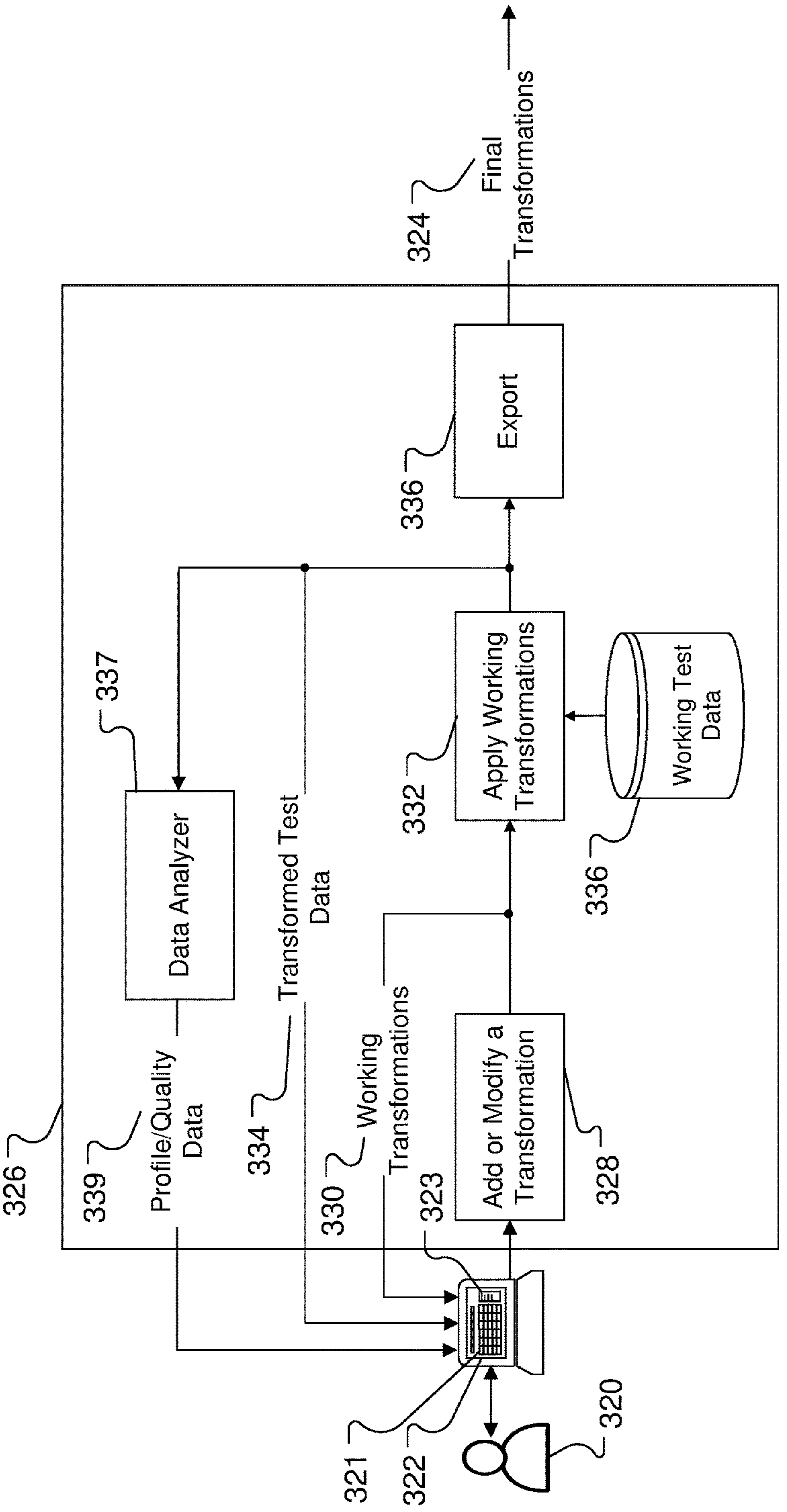
FIG. 3 is a schematic diagram of a system for developing a dataflow graph from user manipulations of data records in a tabular user interface.

Referring to FIG. 3, a user 320 manipulates a tabular view 321 of test data 334 in a user interface 322 according to an iterative development method 326 to develop a set of data transformations referred to as a set of "final" transformations 324. In general, the tabular view 321 provides a familiar and easy-to-use spreadsheet-like interface where the user can iteratively manipulate the test data to develop the set of final transformations 324, which may be a complex data processing program.

The iterative development method 326 includes a first step 328 where the user 320 adds, removes, or modifies a data transformation by manipulating test data displayed in the tabular view 321 (e.g., by adding or removing fields and/or filtering the data). The result of the first step 328 is a set of "working" transformations 330, which are fed back to the user interface 322 and displayed to the user 320 in a transformation history view 323 (e.g., as a list of transformations, described in greater detail below).

The iterative development method 326 includes a second step 332 where the set of working transformations 330 is applied to working test data 336 to form transformed test data 334. As part of the second step 332, the transformed test data 334 is also fed back to the user interface 322, where it is displayed to the user 320 in the tabular view 321. Optionally, as part of the second step 332, the transformed test data 334 can be processed in a data analyzer 337 to generate a profile/quality data 339 for the transformed test data 334. The profile/quality data 339 is displayed to the user 320 in the user interface 322.

As the user manipulates data in the tabular view 321, the first and second steps 328, 332 of the iterative development method 326 are repeated and the user interface 322 is repeatedly updated to reflect the current working transformations 330 and transformed test data 334. The user 320 can view the data profile 339 of the transformed test data 334 at any point during the iterative development method 326 to ensure the data 334 conforms to a desired data profile. For example, the data profile obtained from the transformed data can be checked against a predetermined data profile to recognize any errors. In some examples, the errors are communicated as warning to the user, including information guiding the user how to fix the error. Eventually, in a third step of the iterative development method 326, when the user is satisfied with the state of the transformed test data 334 displayed in the tabular view 321, they export the set of working transformations 330 as the set of final transformations 324. The set of final transformations 324 is exported in a form that is usable to transform data other than the working test data 326. One example of such a form is a component for use in a dataflow graph.

2 Example 1

Figure 4:
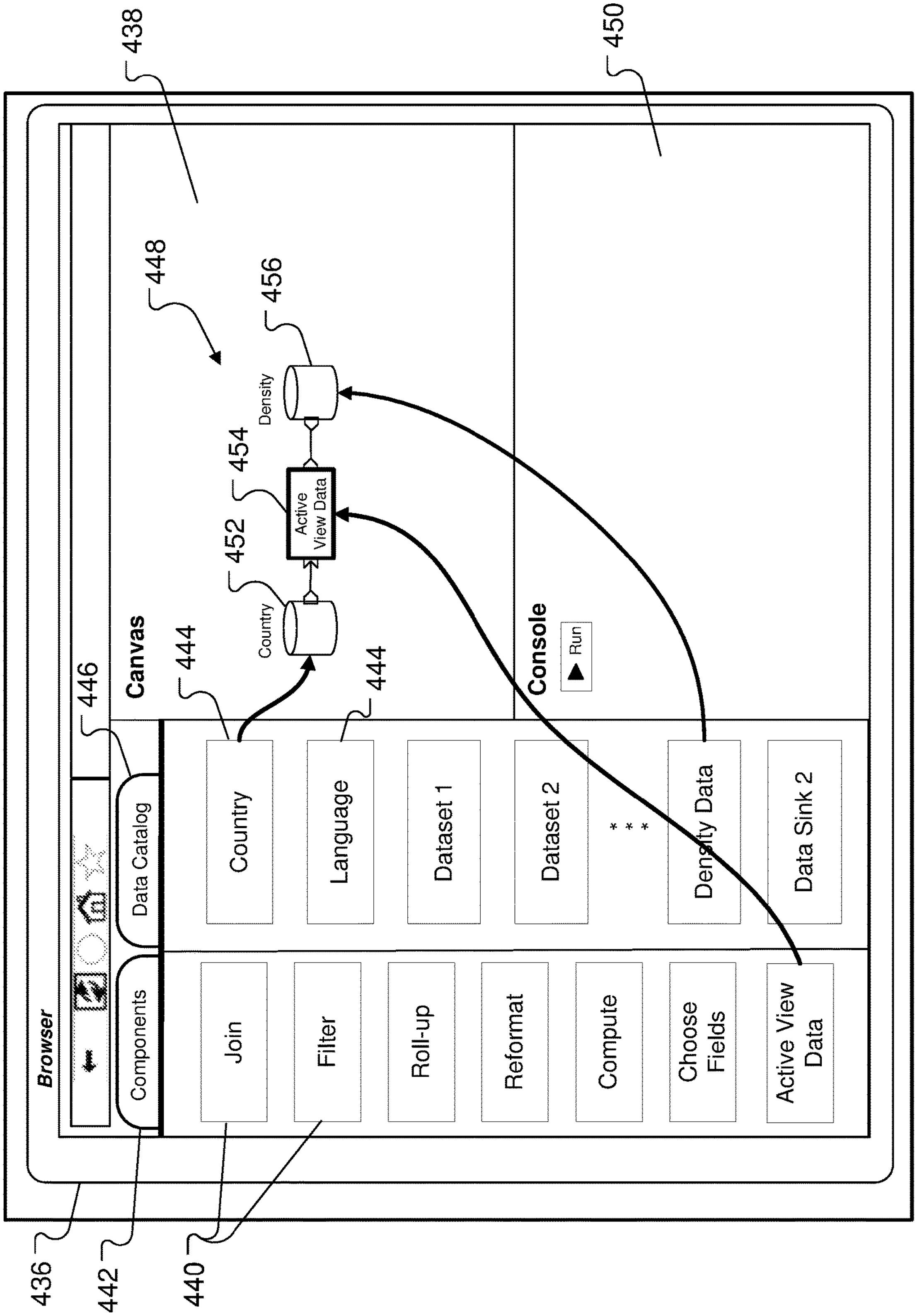
FIG. 4 is a dataflow graph development environment.
Figure 5A:
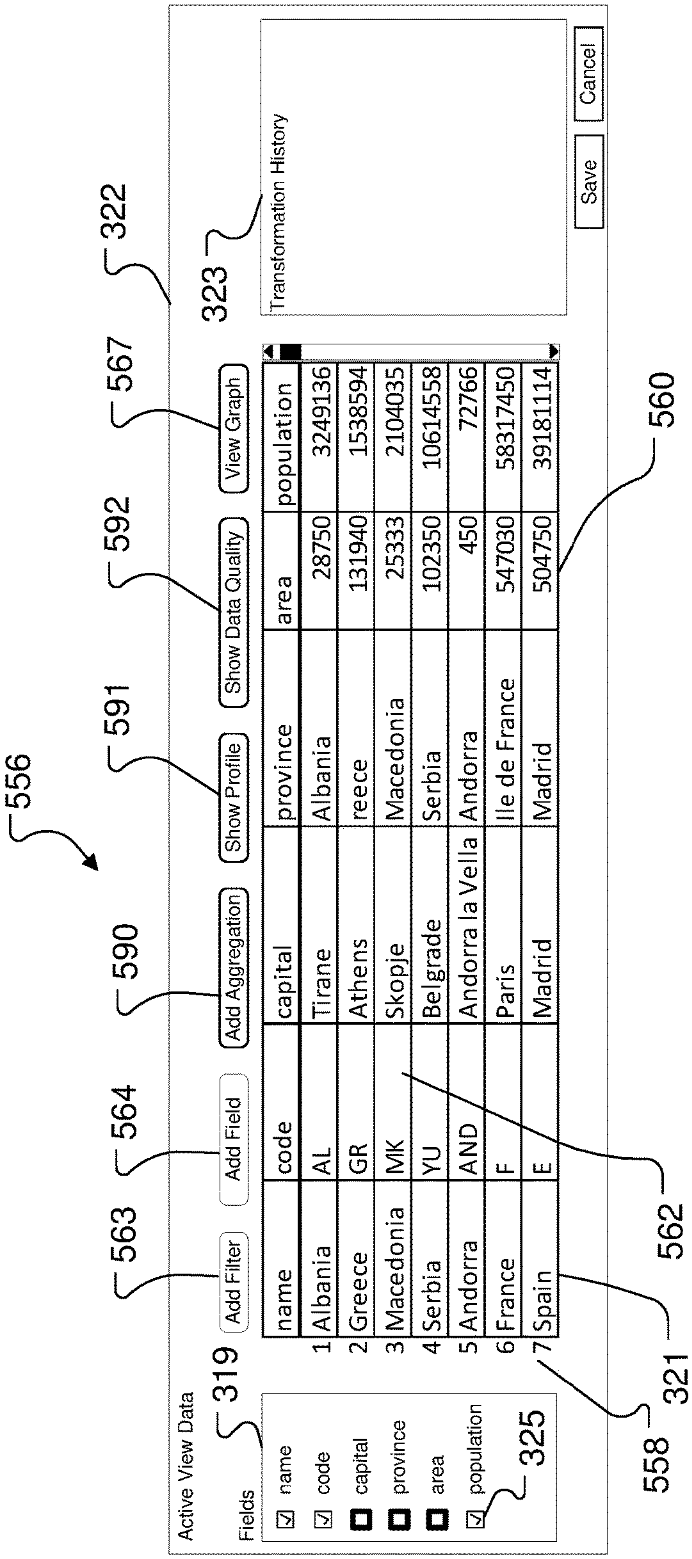
FIG. 5A shows a user interface with a user adding a field selection transformation.
Figure 5B:
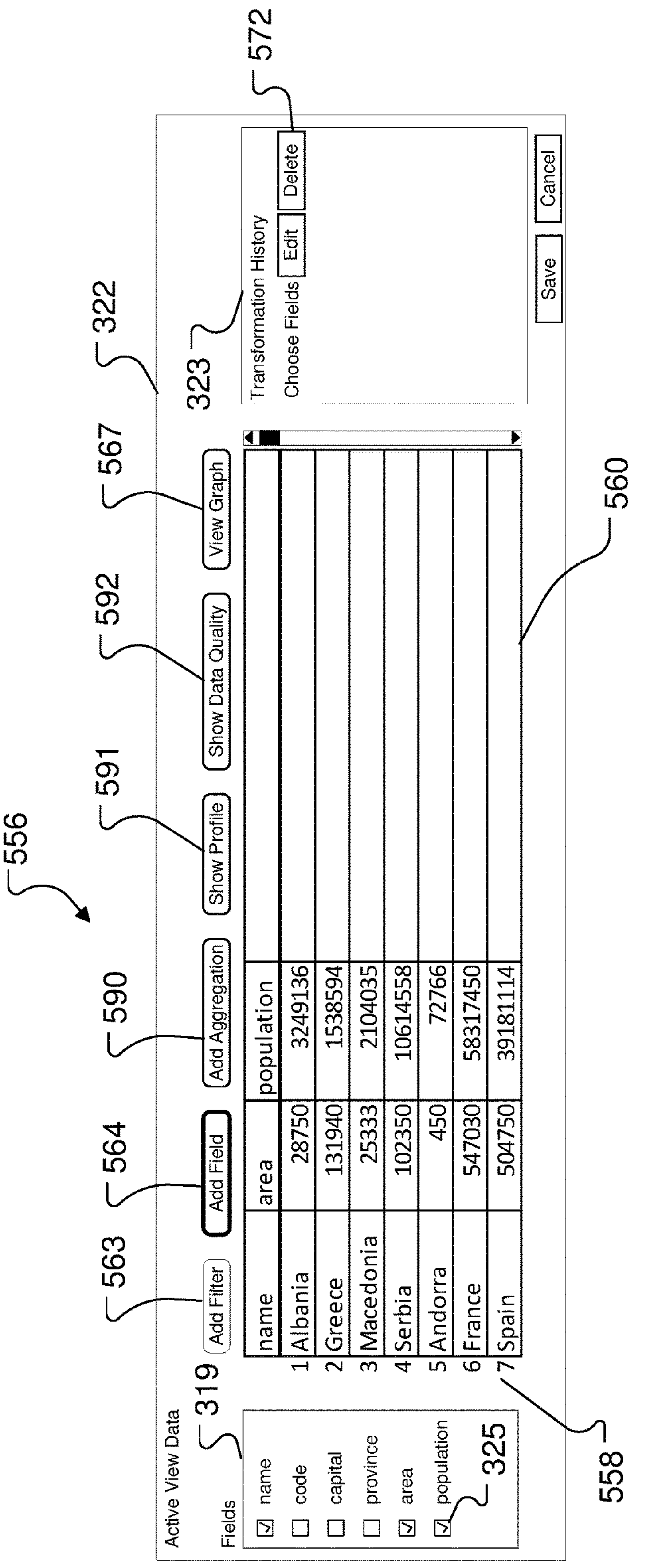
FIG. 5B shows the result of applying the field selection transformation of FIG. 5A and the user selecting a button to add a "Add Field" transformation.
Figure 5C:
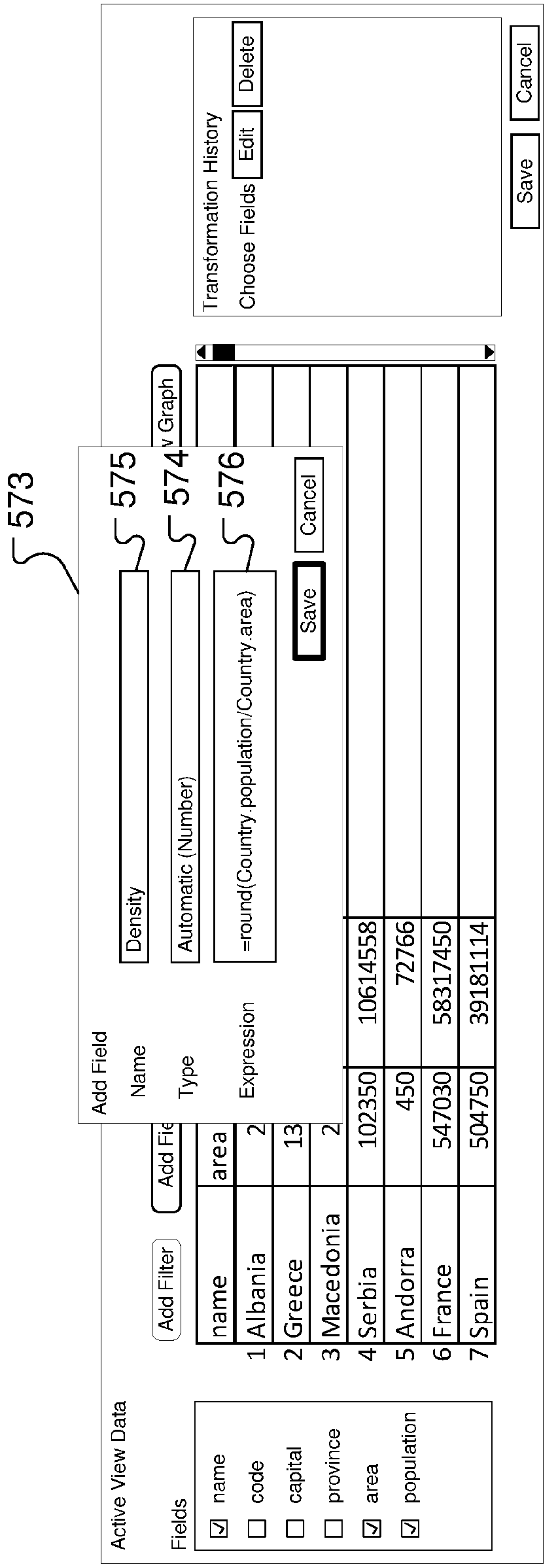
FIG. 5C shows the user configuring the Add Field transformation of FIG. 5B.
Figure 5D:
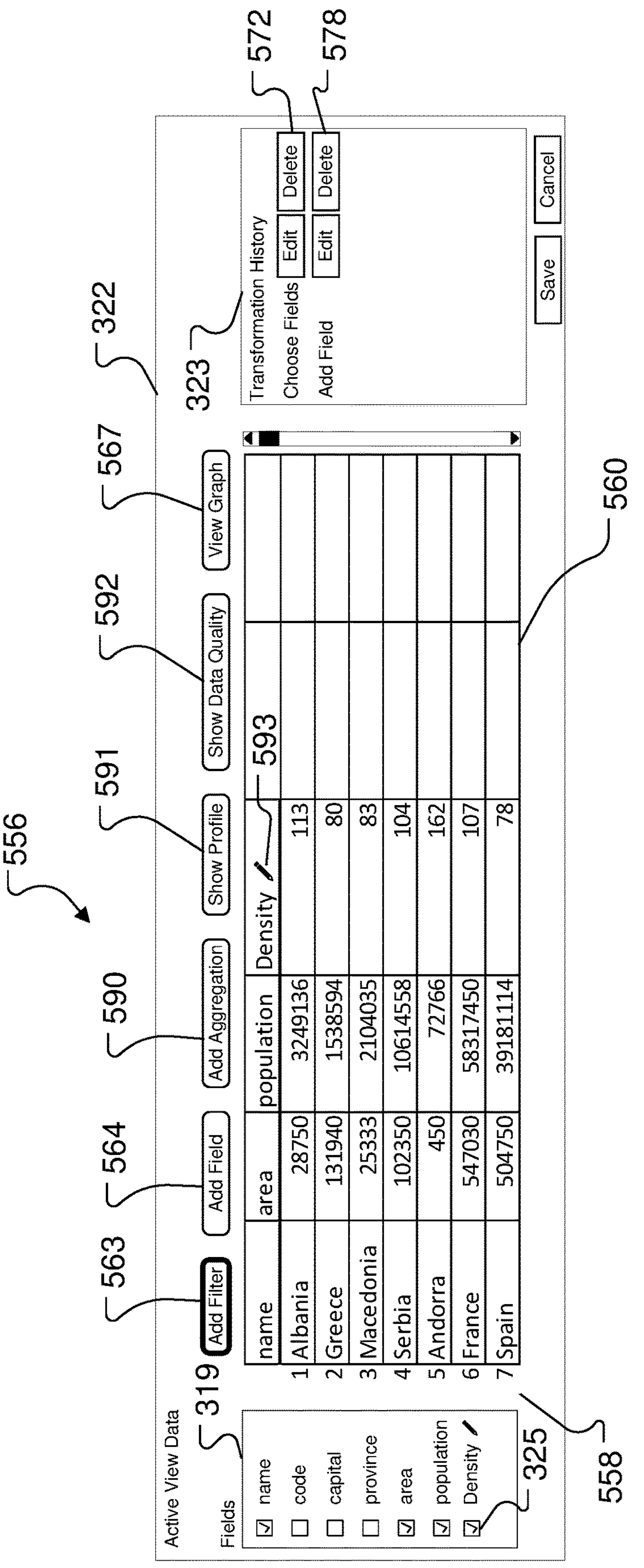
FIG. 5D shows the user interface of FIG. 5B with the Add Field transformation applied and the user selecting a button to add an "Add Filter" transformation.
Figure 5E:
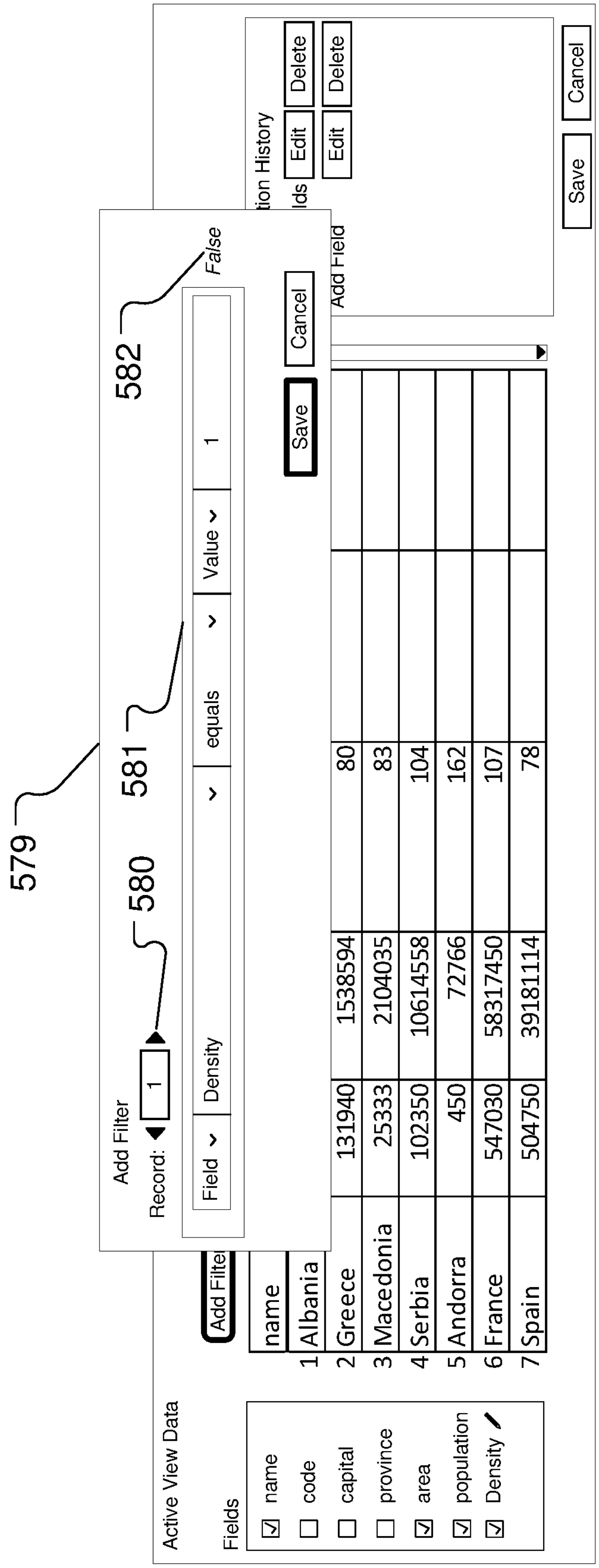
FIG. 5E shows the user configuring the Add Filter transformation of FIG. 5D.
Figure 5F:
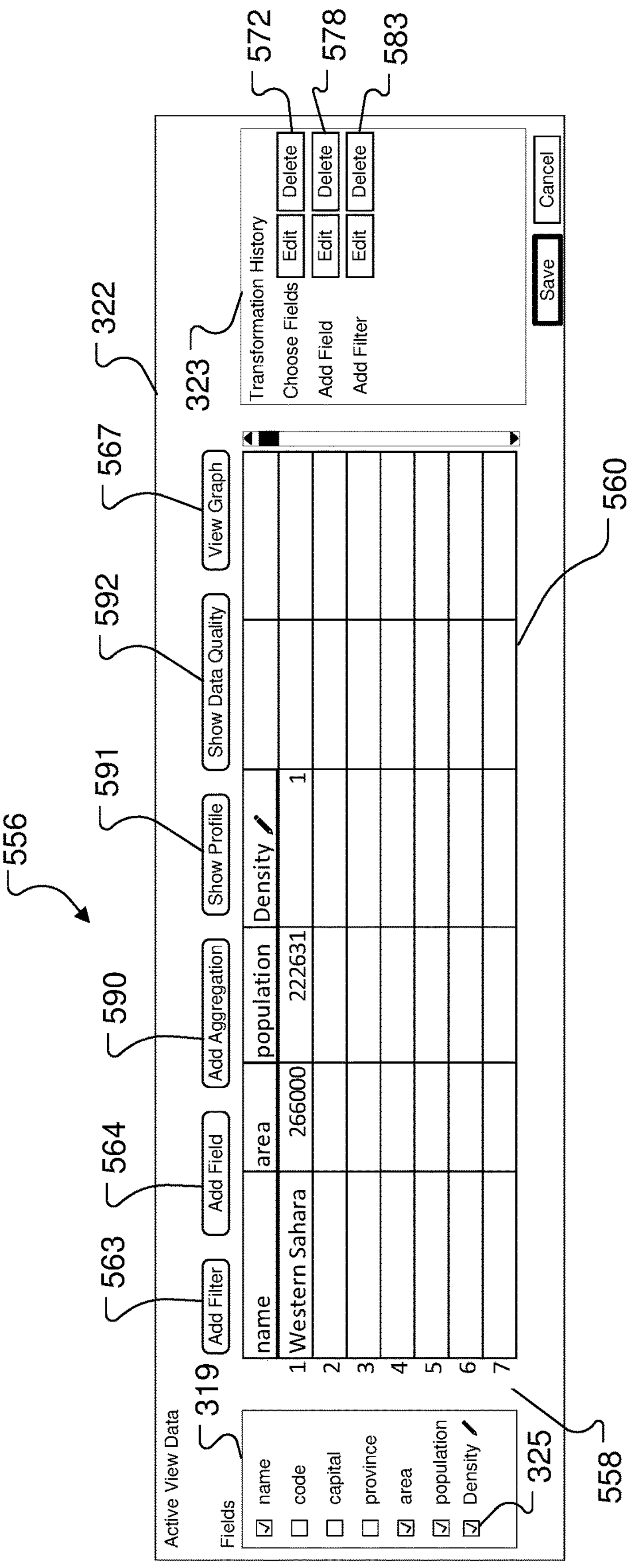
FIG. 5F shows the user interface of FIG. 5D with the Add Filter transformation applied.
Figure 6:
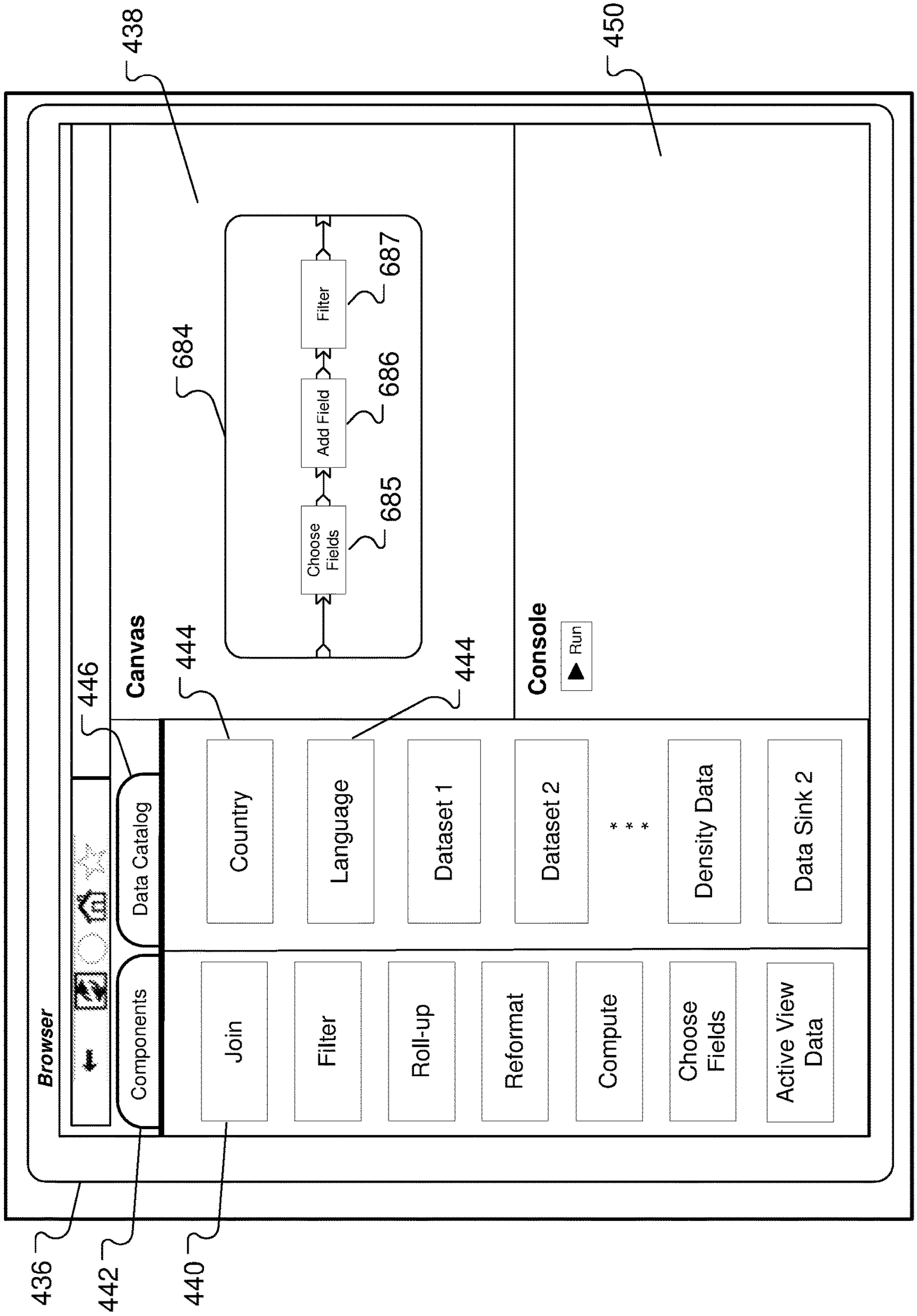
FIG. 6 shows a dataflow graph representation of the set of transformations of FIGS. 5A-5F.

Referring to FIGS. 4-6, a first step-by-step example is provided to illustrate use of the user interface 322 mentioned above according to the iterative development method 326 to generate the set of final transformations 324.

Referring to FIG. 4, in some examples, the user begins the development process in a dataflow graph development environment 436. The dataflow graph development environment 436 of FIG. 4 includes a canvas 438 onto which the user "drags" data processing components 440 from a list of components 442 and data sources and sinks 444 from a data catalog 446. The user then "wires" input and output ports of the components, data sources, and data sinks together to establish a flow of data through a dataflow graph 448. The user can execute the dataflow graph 448 and view the results in a console 450.

In FIG. 4, to create the dataflow graph 448, the user has dragged a "Country" data source 452, an "Active View Data" component 454, and a "Density" data sink 456 onto the canvas 438. An output port of the Country data source 452 is wired to an input port of the Active View Data component 454 and an output port of the Active View Data component 454 is wired to an input port of the Density data sink 456 to form the dataflow graph 448.

Next, the Active View Data component 454 is configured by the user to process data from the Country data source 452 the generate density data that is written to the Density data sink 456. To do so, the user double clicks on the Active View Data component 454 to open the component. Throughout the remainder of this example, the user interacting with an element of the user interface is indicated by the outline of the element being shown in a bolded line. For example, in FIG. 4, the user has interacted with (e.g., "clicked" on) the Active View Data component 454, and the outline of that component is shown in a bolded line.

Referring to FIG. 5A, opening the Active View Data component 454 causes the active view data user interface 322 to be displayed. The user interface 322 includes the tabular view 321, a field selection menu 319, the transformation history view 323, and a number of buttons 556.

The tabular view 321 displays the test data 334 in a tabular form, with rows 558 corresponding to record numbers (e.g., records 1-7) and columns 560 corresponding to fields of the records (e.g., "country name," "country code," etc.). Field values for particular records are displayed in cells 562 at the intersections of particular rows and columns (e.g., the code for record 3 is "MK"). The user 320 can scroll through the tabular view 321 to view the test data 334 (note that no transformations are included in the set of working transformations of FIG. 5A, so the tabular view 321 displays the original working test data).

The field selection menu 319 includes a checkbox 325 for each field in the original working test data. Each checkbox can be toggled to select whether its associated field is displayed in the tabular view 321. In FIG. 5A, the checkboxes for all fields were previously "checked," so all fields are displayed in the tabular view 321. The transformation history view 323 displays an ordered list of the current set of working transformations 330. In FIG. 5A, the set of working transformations is empty, so nothing is shown in the transformation history view 323.

The buttons 556 are associated with a set of data transformations or other operations that can be applied to the working test data 336. In some examples, the buttons include an "Add Filter" button 563 that allows the user to add a Filter transformation to the set of working transformations 330, an "Add Field" button 564 to add an "Add Field" transformation to the set of working transformations, an "Add Aggregation" button 590 that allows the user to add an "Add Aggregation" transformation to the set of working transformations, a "Show Profile" button 591 that allows the user to view a data profile of transformed test data 334, and a "Show Data Quality" button 592 that allows the user to view results of a data quality analysis of the transformed test data 334. The transformations and operations associated with the buttons 556 are described in greater detail below. A "View Graph" button 567 causes a dataflow graph associated with set of working transformations to be displayed to the user.

In FIG. 5A, the user has "unchecked" checkboxes 325 associated with the code, capital, and province fields in the field selection menu 319 while leaving the name, area, and population checkboxes checked. Referring to FIG. 5B, unchecking the checkboxes 325 associated with the code, capital, and province fields causes the addition of a Choose Fields transformation set of working transformations 330, which is applied to the working test data to generate the transformed test data 334. As a result of applying the Choose Fields transformation, the name, area, and population fields are the only fields remaining in the transformed test data 324 and displayed in the tabular view 321. Furthermore, the Choose Fields transformation is added as a first transformation 572 in the transformation history view 323.

In FIG. 5B, next the user clicks the Add Field button 564 to begin adding an Add Field transformation to the set of working transformations 330. Referring to FIG. 5C, the user clicking the Add Field button 566 causes an Add Field dialog 573 to appear. The dialog 573 includes a "Name" field 575, a "Data Type" field 574, and an "Expression" field 576.

The Name field 575 requires the user to specify a name for the new column. In this case the user has chosen "Density" as the name for the new column. The Data Type field 574 allows the user to choose a data type for the new column from a list of data types such as Number, String, and Boolean data types (or the user can choose to automatically detect the data type). In this case, the user has chosen automatic detection of the data type, which results in Number being the data type for the new column.

The Expression field 576 requires the user to specify an expression (e.g., a calculation based on values of one or more fields in a record), which is used to populate the values in the new column. In this case, the user has specified the expression to calculate the population density of the countries as:

"=round(Country.population/Country.area)"

(i.e., the population of the country divided by the area of the country, rounded to the nearest integer value). When finished, the user clicks the save button to return to the user interface 322.

Referring to FIG. 5D, upon returning to the user interface 322, the set of working transformations 330, now including the Add Field transformation, is applied to the working test data 336 to generate the transformed test data 334. As a result of applying the Add Field transformation, a new Density field 577 is now present in the tabular view 321, showing the calculated population density for each country (i.e., row) shown in the tabular view 321. Note the pencil icon 593 beside the title of the Density field, indicating that the field is added by the user. Furthermore, the Add Field transformation is added as a second transformation 578 in the transformation history view 323.

In FIG. 5D, the user then clicks the "Add Filter" button 563 to add a "Filter" transformation to the set of working transformations 330. Referring to FIG. 5E, the user clicking the Add Filter button 566 causes an "Add Filter" dialog 579 to appear. The dialog 579 includes a record selection field 580, an expression definition field 581, and an expression output indicator 582. The expression definition field 581 allows the user to specify conditions that are applied to values in one or more fields in the working test data 336 to determine which records of the working test data are "filtered out" of the transformed test data 334 displayed in the tabular view 321. For example, in FIG. 5E the user has defined an expression that keeps only records where the Density field has a value equal to "1." The user can navigate through the records of the transformed test data using the record selection field 580 and, as the user navigates, the filter expression is evaluated on the currently selected record to populate the expression output indicator 582. For example, in FIG. 5E the user has selected record "1" using the record selection field 580, and the expression indicator includes a "False" value, indicating the Density value for record 1 is not equal to "1" (recall from FIG. 5D that record 1's population density value is equal to 113). The False value indicates that record 1 will be filtered out of the transformed test data ultimately displayed in the tabular view 321. When the user is satisfied with their Filter transformation, they click the save button return to the user interface 322.

Referring to FIG. 5F, upon returning to the user interface 322, the set of working transformations, now including the Filter transformation, is applied to the working test data 336 to generate the transformed test data 334. As a result of applying the Filter transformation, only a single record remains in the transformed test data 334 displayed in the tabular view 321—"Western Sahara," which is the only country in the working test data with a population density roughly equal to "1." Furthermore, the Add Filter transformation is added as a third transformation 583 in the transformation history view 323.

In some examples, when the user is satisfied with the transformed test data 334, as shown in the tabular view 321, they can click the save button to export the set of working transformations as the set of final transformations 324. Clicking the save button returns the user to the dataflow graph development environment 436 of FIG. 4, where the active view data component 454 is configured according to the set of final transformations and can be reused to process other data sources from the data catalog 446.

Referring to FIG. 6, in other examples, the user can click the "View Graph" button 567 to display a dataflow graph representation of the set of working transformations 684 on the canvas 438 of the dataflow graph development environment 436. In this example, the dataflow graph representation of the set of working transformations 684 includes a Choose Fields component 685, an Add Field component 686, and a Filter component 687, all interconnected according to the order of the transformations in the set of working transformations (e.g., as shown in the transformation history view 323).

3 Example 2

Referring to FIGS. 7A-7E, a second step-by-step example is provided to illustrate use of the user interface 322 described above to generate a set of final transformations 324. In the second example, the set of final transformations 324 includes a roll-up aggregation and the user utilizes a data profile to develop the final set of transformations.

Figure 7A:
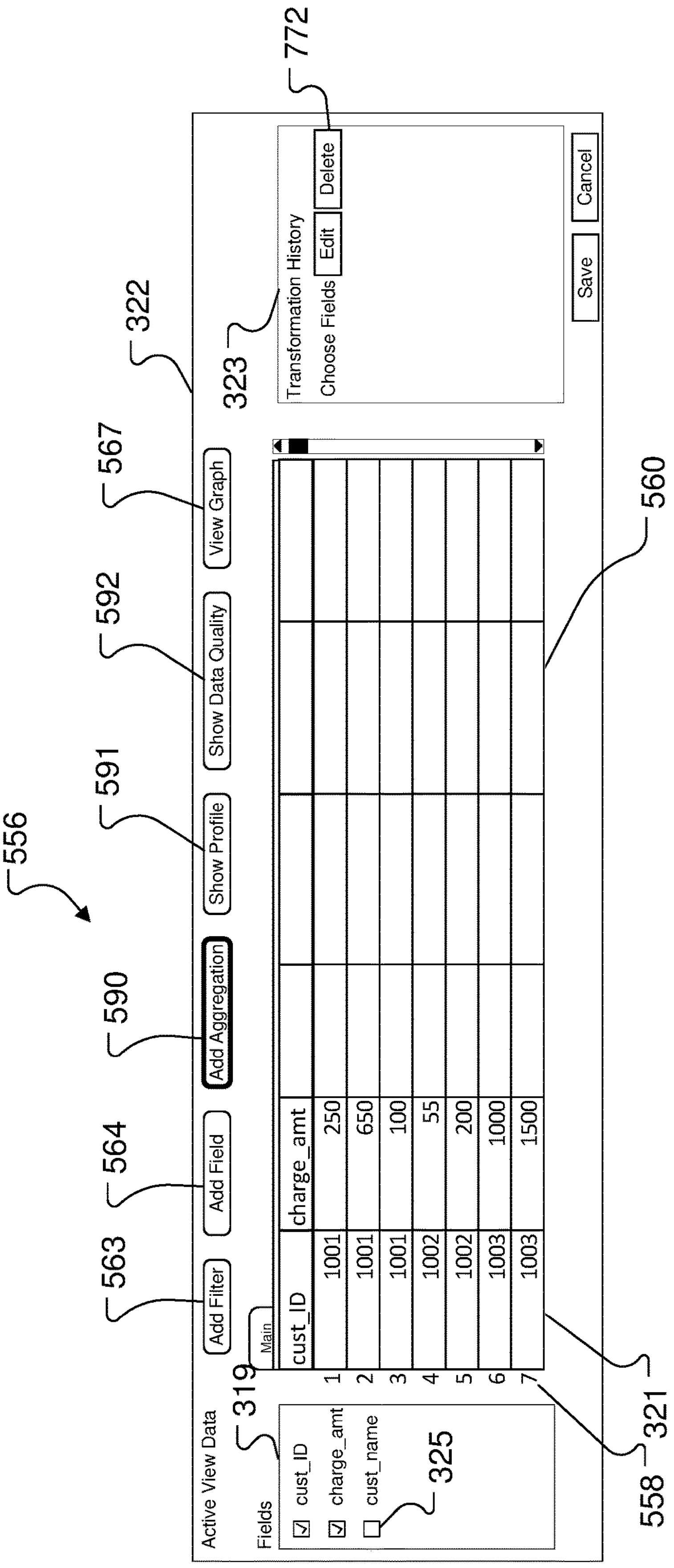
FIG. 7A shows a user interface with a user selecting a button to add an "Add Aggregation" transformation.

Referring to FIG. 7A, the user 320 has already used the field selection menu 319 to add a Choose Fields transformation to the set of working transformations. The Choose Fields transformation is applied working test data 336 to generate transformed test data 334 including a customer ID ("cust_ID") field and a charge amount ("charge_amt") field. In this example, each row of the transformed test data represents a different transaction, where a customer with a particular customer ID was charged a charge amount (e.g., the customer made a purchase using their credit card). The Choose Fields transformation is shown as a first transformation 772 in the transformation history view 323.

Figure 7B:
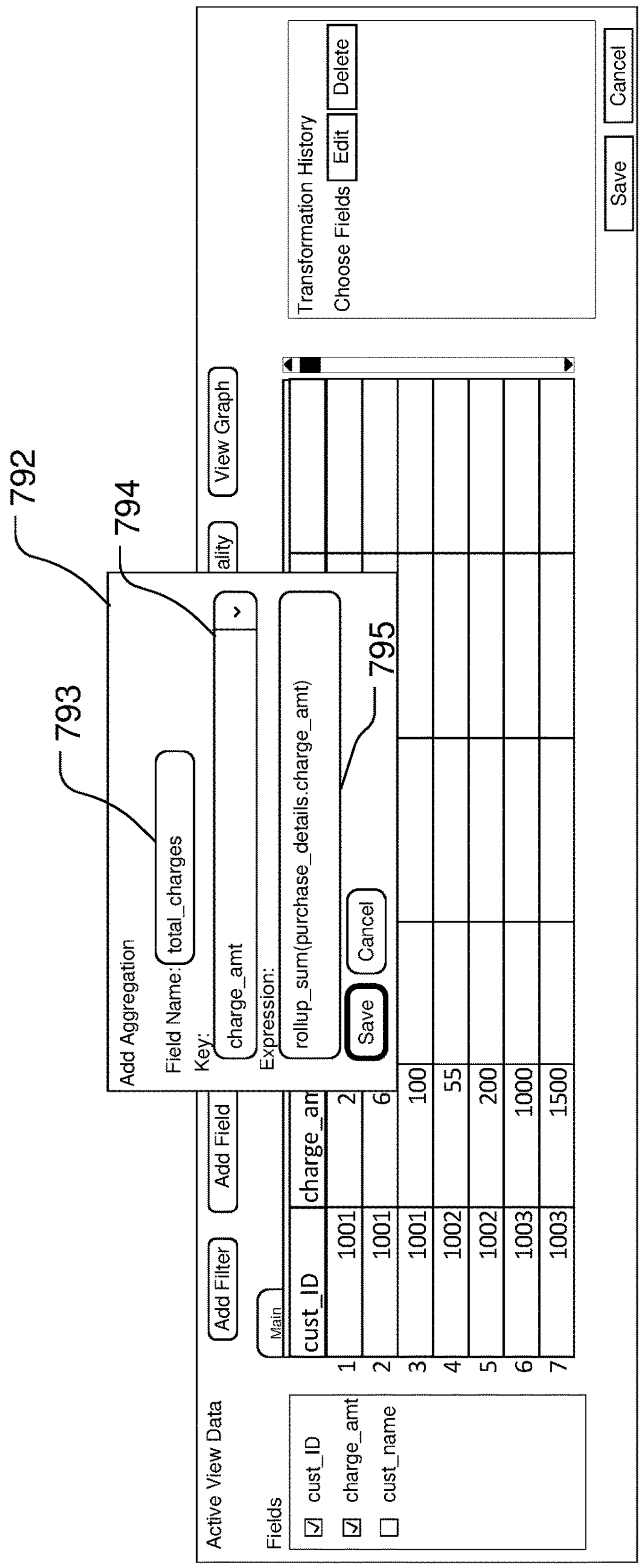
FIG. 7B shows the user configuring the Add Aggregation transformation.

In FIG. 7A, the user clicks the "Add Aggregation" button 590 to add an "Aggregation" transformation to the set of working transformations 330. Referring to FIG. 7B, clicking the Add Aggregation button causes an "Add Aggregation" dialog 792 to appear. The dialog 792 includes a "Field Name" field 793, an aggregation "Key" field 794, and an aggregation "Expression" field 795. The Field Name field 793 is the name of the field where the result of the aggregation transformation is stored. In the example of FIG. 7B, the user has entered "total_charges" into the Field Name field 793 because they want to determine a total amount of the charges for each customer ID.

In the aggregation Key field 794, the user 320 has selected the charge_amt field as the aggregation Key. The user has populated the aggregation Expression filed 795 with the Expression:

"rollup_sum(purchase_details.charge_amt)"

indicating that the aggregation transformation is a rollup aggregation that determines a sum of charge_amt values for each unique cust_ID. In FIG. 7B, the user has clicked the save button to return to the user interface 322.

Figure 7C:
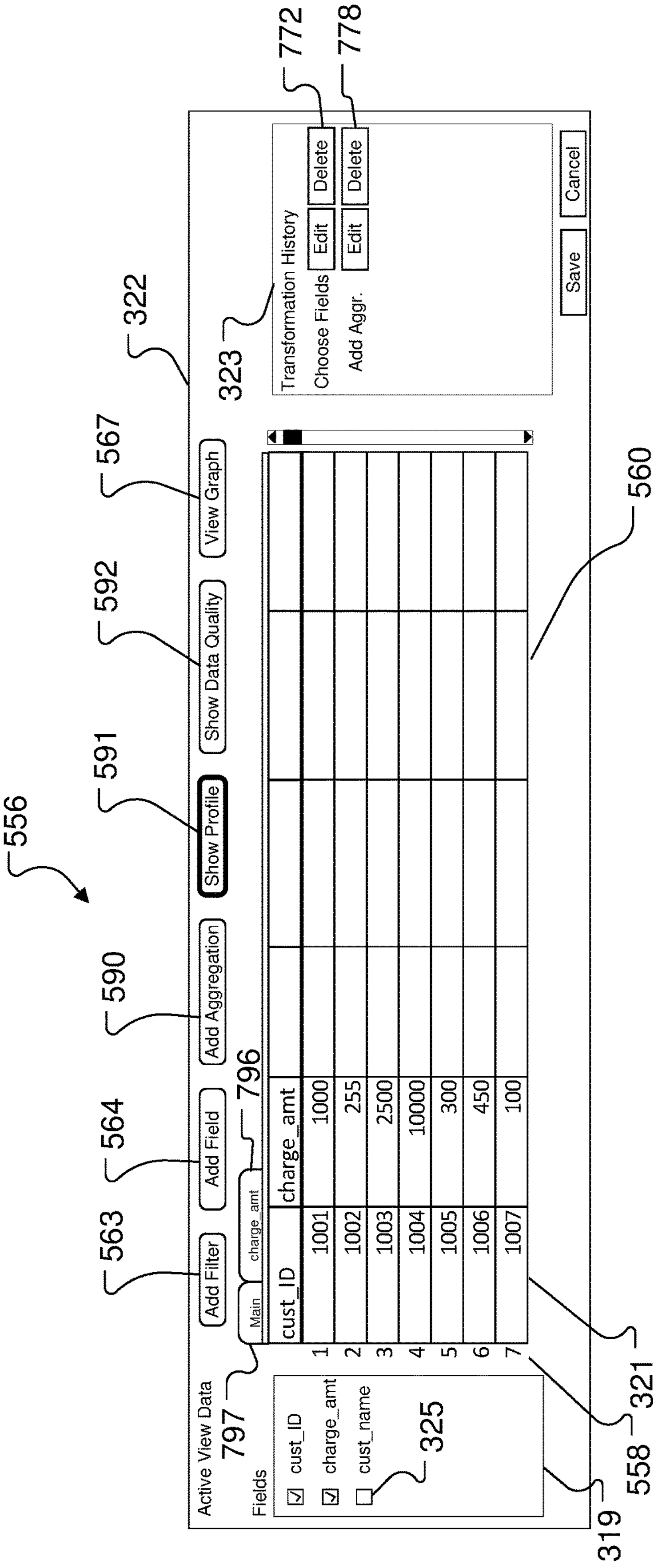
FIG. 7C shows the user interface of FIG. 7A with the Add Aggregation transformation applied and the user selecting a button to view a data profile.

Referring to FIG. 7C, upon returning to the user interface 322, the set of working transformations 330, including the Add Aggregation transformation, is applied to the working test data to generate the transformed test data 334. As a result of applying the Add Aggregation, the cardinality of the transformed test data 334 changes—there are fewer rows in this case because rows representing multiple transactions for the cust_IDs are collapsed into a single row representing a sum of charge amts for the cust_IDs. To represent this change in cardinality, a new page 796 titled "charge_amt" is added to the tabular view 321 of the user interface 322. The user can switch between the charge_amt page 796 and a tab for the original, "Main" page 797 by clicking on tabs associated with the pages. The Add Aggregation transformation is added as a second transformation 778 in the transformation history view 323 (abbreviated as "Add Aggr.").

Figure 7D:
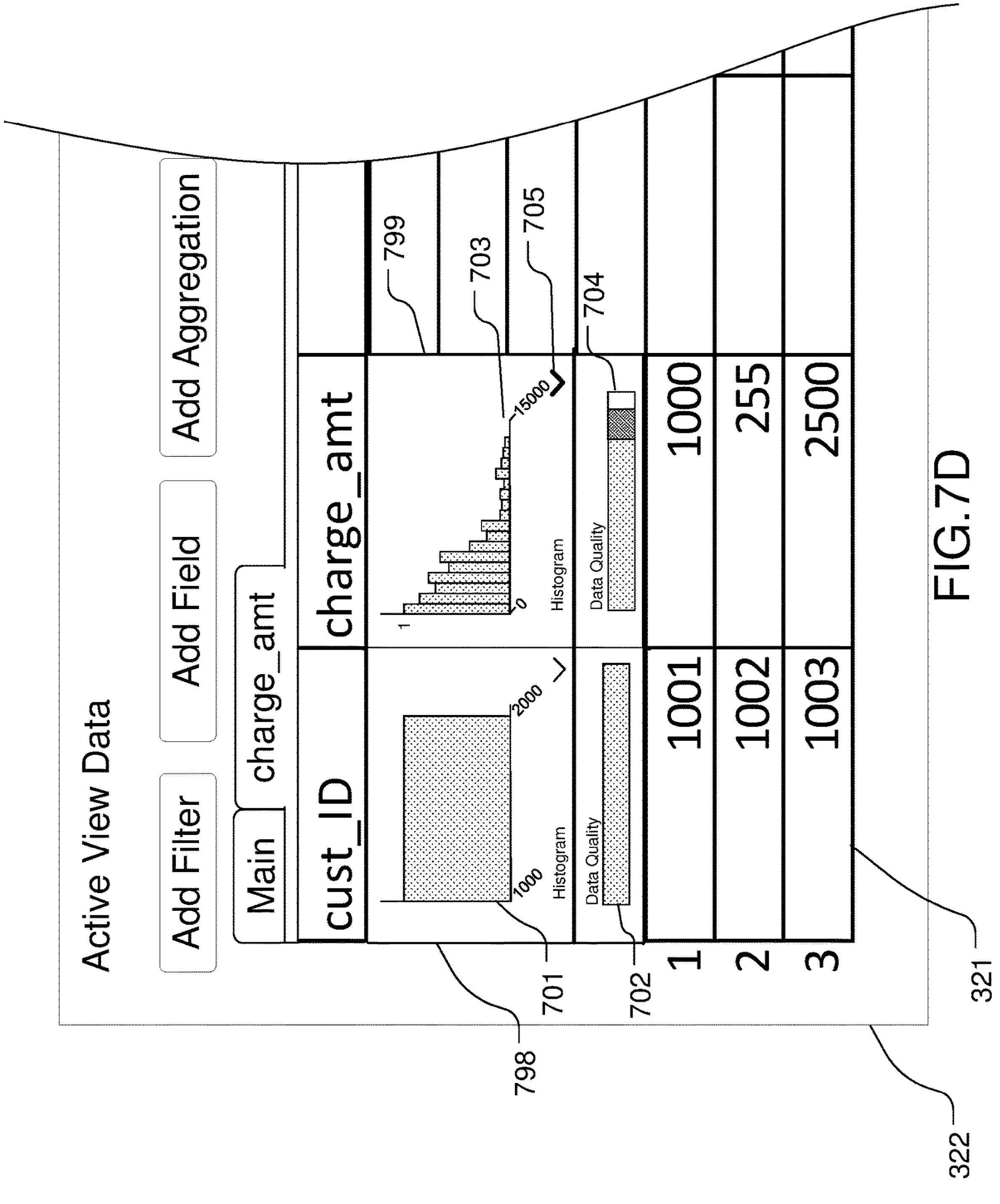
FIG. 7D shows a representation of a data profile rendered in the user interface of FIG. 7A.

In FIG. 7C, next the user clicks the Show Profile button 591 to view a data profile of the transformed test data 334 shown in the tabular view 321. Referring to FIG. 7D, the user clicking the Show Profile button 591 causes the data profiler 337 to compute profile data 339 for the transformed test data 334. A graphical representation of the profile data for each field in the transformed test data 334 is then displayed in that field's column of the tabular view 321.

In FIG. 7D, a first graphical representation of profile data 798 is displayed in the cust_ID column, and a second graphical representation of profile data 799 is displayed in the charge_amt column. The first graphical representation 798 includes a histogram 701 showing that the cust_ID field has values ranging from about 1000 to 2000 and there are no duplicate values (i.e., there is "1" instance of each unique cust_ID). The first graphical representation 798 also includes a data quality bar 702 showing that the data quality for the field is high (e.g., data with few duplicate entries, few blank entries, and/or few entries with invalid or incorrect values). The second graphical representation of profile data 799 includes a histogram 703 showing that most customers have charge_amt values less than ~$7,000, but there are some customers with charge_amt values above that number and up to ~$15,000. The second graphical representation of profile data 799 also includes a data quality bar 704 showing some minor data quality issues, shown as areas with different patterns in the data quality bar. More generally, data profiles provide information about certain characteristics of the data. That information can be used to determine whether the data transformations applied to the data are fit for deployment. For example, data profiles can group customers into bins based on how much money the users have spent. Developers may use data profiles to identify problems (e.g., bugs) in the transformations. For example, if all customers fall into one bin, or the bin values are not what the developer expected, the developer may revisit their transform to debug. Data quality characterizes how complete and correct the data is. For example, data quality characterizes aspects of the data such as duplicate records in the data, records with missing fields, and records with incorrect data (e.g., misspelling, invalid zip codes, invalid, etc.). Developers can use data quality to gauge the quality of the results generated by their transformations and correct their transformations to address data quality issues, if necessary.

Figure 7E:
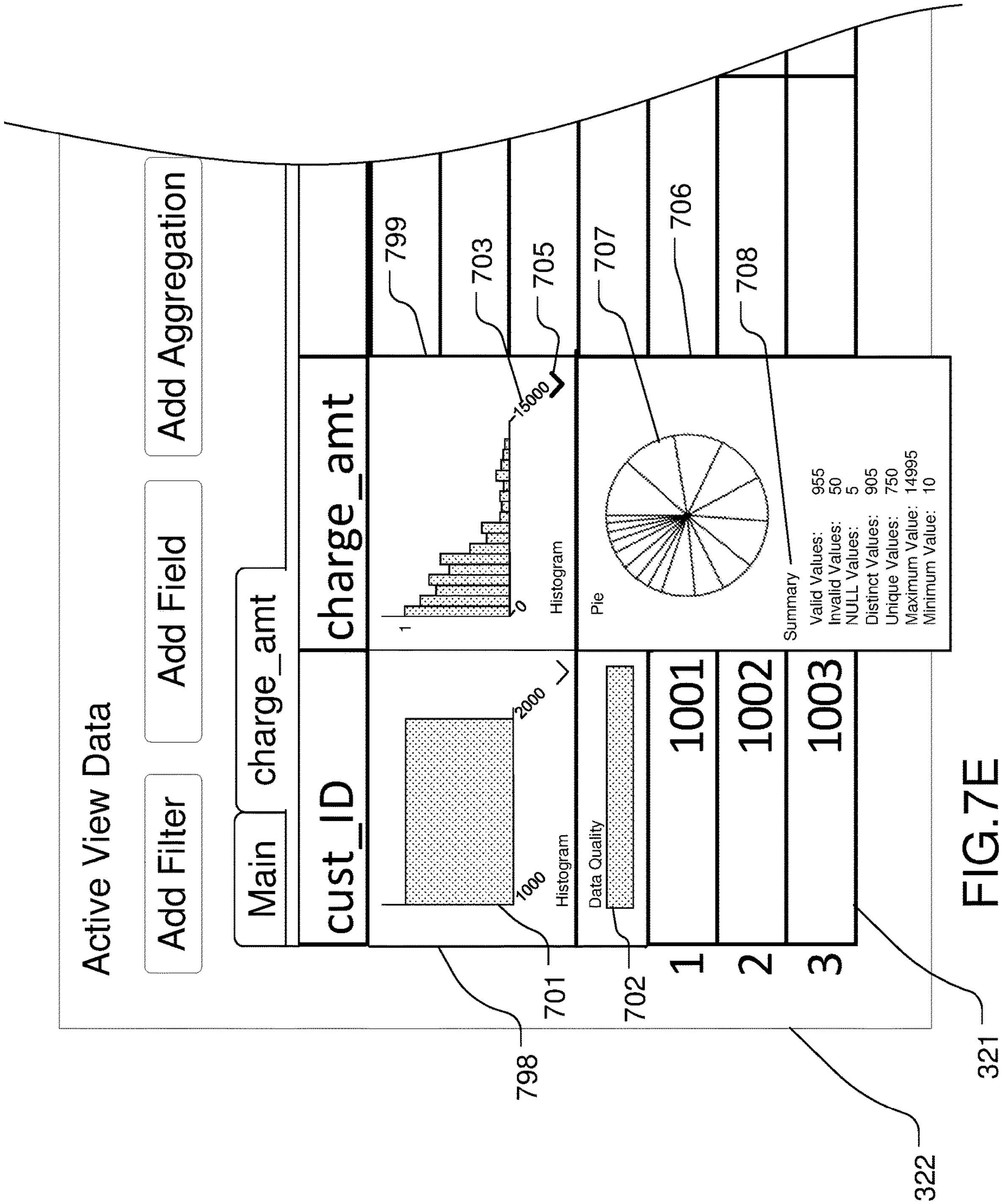
FIG. 7E shows a representation of a data quality analysis rendered in the user interface of FIG. 7A.

In FIG. 7D, the user 320 clicks a carat 705 to explore details about the data quality issues for the charge_amt field. Referring to FIG. 7E, the user clicking the carat 705 causes the display of a data profile view 706. The data profile view 706 includes a pie chart 707 of the different charge_amt values and a summary of the values 708, including counts of valid values, invalid values, NULL values, distinct values, unique values, and maximum and minimum values. In this case, the user 320 can see that there are 50 invalid values and 5 Null values, which are the source of the data quality issues shown in the data quality bar 704. Furthermore, the user 320 can see that there are 905 distinct values, 750 unique values, a maximum value of $14,995, and a minimum value of $10. After viewing the profile data 339, the user 320 may decide to modify the set of working transformations to adjust the data profile.

In some examples, a more complete characterization of the data quality is accessed by clicking the "Show Data Quality" button 592 of the user interface 322. Discussion of that characterization of the data quality is beyond the scope of this invention and is not discussed further herein.

4 Alternatives

In some examples, the user may need to modify or remove transformations from the set of working transformations 330. The user can do so in the user interface 322 by interacting with list of transformations in the transformation history view 323 (e.g., by clicking the modify or remove buttons associated with the transformations in the list). Furthermore, there may be situations where the user wants to reorder the transformations in the transformation history view. In such cases, the user can, for example, drag the transformations to modify the order shown in the transformation history view.

It should be appreciated that the types of transformations described in the example above are only an example of the transformations that may be available in the user interface 322 and that other transformations may be available to the user.

In the examples described above, the data being accessed by the data processing programs are shown as datasets (e.g., databases or other sets of data stored on disk or in memory). However, it should be appreciated that flows of data can also be used to develop the data processing programs and can be processed by the data processing programs in a runtime setting.

The step of exporting the set of final transformations 324 may be a compilation step that translates the set of final transformations into a lower-level programming language such as assembly language, object code, or machine code to create an executable program. Alternatively, the exporting step may translate the set of final transformations into Ab Initio's DML programming language, into an Ab Initio dataflow graph, or into an Ab Initio "EZ Graph" which is an easily modifiable and optimizable computational graph (described in U.S. Patent Pub. 2021-0232579, the contents of which are incorporated herein by reference). Finally, the exporting step may export the set of transformations without any translation.

The data processing program exported from the iterative development method described above is not only usable to process the working test data but is also usable to process other, real-world data in both batch and streaming applications.

5 Implementations

The computational resource allocation approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of data processing graphs. The modules of the program (e.g., elements of a data processing graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

Some examples described herein are directed to systems and methods for for developing a reusable data processing program including a set of data transformation steps by displaying a set of records and iteratively enabling a user to select one or more data transformation steps, iteratively applying the data transformation steps to the records, and iteratively displaying the transformed records includes accessing a number of input records, rendering a representation of the number of transformed records in a user interface, the number of transformed records determined by applying the set of data transformation steps to the number of input records, and receiving first user input as the user manipulates the representation of the number of transformed records using the user interface, the first user input including one or more data transformation steps. For each data transformation step of the one or more data transformation steps, the method includes adding the data transformation step to the set of data transformation steps, updating the number of transformed records, including applying the set of data transformation steps to the number of input records, and rendering a representation of the transformed number of transformed records in the user interface. The method further includes receiving second user input causing export of the reusable data processing program based at least in part on the set of data transformation steps, the reusable data processing program being applicable to one or more pluralities of records different from the number of input records.

The set of data transformation steps may include a number of data transformation steps. The number of data transformation steps may be applied sequentially according to an order specified by the user. The method may include rendering a representation of the set of data transformation steps in the user interface during development of the reusable data processing program. The representation of the set of data transformation steps may display the data transformation steps in a list ordered according to the order specified by the user. The representation of the set of data transformation steps may include a dataflow graph representation of the data transformation steps. The method may include receiving third user input causing removal of one or more data transformation steps from the set of data transformation steps. The method may include receiving third user input causing modification of one or more data transformation steps from the set of data transformation steps.

The user interface may include a tabular interface and the representation of the number of transformed records is rendered in the tabular interface. The user interface may include a list interface where the set of data transformation steps is rendered as a list in the list interface. The set of data transformation steps rendered in the list interface may be ordered according to an order of application of the data transformation steps to the number of input records. The method may include receiving third user input to change the order of application of the set of data transformation steps. The method may include interacting with a data transformation step using the list interface to modify the data transformation step. The method may include interacting with a data transformation step using the list interface to remove the data transformation step from the set of data transformation steps.

The set of data transformation steps may include one or more of a filter data transformation step, an add field data transformation step, and a choose fields data transformation step. The set of data transformation steps may include a filter data transformation step. Causing export of the reusable data processing program may include compiling the set of data transformation steps to form the reusable data processing program. Causing export of the reusable data processing program may include forming a dataflow graph representation (e.g., with components of the computation being associated with the vertices of the graph and data flows between the components corresponding to links (arcs, edges) of the graph) of the set of data transformation steps to form the reusable data processing program.

The method may include computing a data profile for the number of transformed records and rendering a representation of the data profile in the user interface. The second user input may be received upon determining that a data profile for the number of transformed records is in accordance with a predetermined data profile.

The predetermined data profile or predetermined profile rule may specify an allowable range for some characteristics of the data profile. The method may include computing a data quality for the number of transformed records and rendering a representation of the data quality in the user interface. The data quality may include at least one of counts of valid values, invalid values, NULL values, distinct values, unique values, and/or maximum and minimum values.

In another example, a system for developing a reusable data processing program including a set of data transformation steps by displaying a set of records and iteratively enabling a user to select one or more data transformation steps, iteratively applying the data transformation steps to the records, and iteratively displaying the transformed records includes means for accessing a number of input records, means for rendering a representation of the number of transformed records in a user interface, the number of transformed records determined by applying the set of data transformation steps to the number of input records, means for receiving first user input as the user manipulates the representation of the number of transformed records using the user interface, the first user input including one or more data transformation steps, and means for processing configured to, for each data transformation step of the one or more data transformation steps add the data transformation step to the set of data transformation steps, update the number of transformed records, including applying the set of data transformation steps to the number of input records, and render a representation of the transformed number of transformed records in the user interface. The system also includes means for receiving second user input causing export of the reusable data processing program based at least in part on the set of data transformation steps, the reusable data processing program being applicable to one or more pluralities of records different from the number of input records.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for developing a reusable data processing program including a set of data transformation steps by displaying a set of records and iteratively enabling a user to select one or more data transformation steps, iteratively applying the data transformation steps to the records, and iteratively displaying the transformed records, the method including:

accessing a plurality of input records;

rendering a representation of the plurality of transformed records in a user interface, the plurality of transformed records determined by applying the set of data transformation steps to the plurality of input records;

receiving first user input as the user manipulates the representation of the plurality of transformed records using the user interface, the first user input including one or more data transformation steps;

for each data transformation step of the one or more data transformation steps:

adding the data transformation step to the set of data transformation steps, updating the plurality of transformed records, including applying the set of data transformation steps to the plurality of input records, and rendering a representation of the transformed plurality of transformed records in the user interface; and receiving second user input causing export of the reusable data processing program based at least in part on the set of data transformation steps, the reusable data processing program being applicable to one or more pluralities of records different from the plurality of input records, wherein the user interface includes a tabular interface and the representation of the plurality of transformed records is rendered in the tabular interface, and the tabular interface includes columns associated with fields of the plurality of transformed records, one or more of the columns is a user created column, and the user created column includes an icon indicating the column as user created.

2. The method of claim 1 wherein the set of data transformation steps includes a plurality of data transformation steps.

3. The method of claim 2 wherein the plurality of data transformation steps is applied sequentially according to an order specified by the user.

4. The method of claim 3 further including rendering a representation of the set of data transformation steps in the user interface during development of the reusable data processing program.

5. The method of claim 4 wherein the representation of the set of data transformation steps displays the data transformation steps in a list ordered according to the order specified by the user.

6. The method of claim 4 wherein the representation of the set of data transformation steps includes a dataflow graph representation of the data transformation steps.

7. The method of claim 4 further including receiving third user input causing removal of one or more data transformation steps from the set of data transformation steps.

8. The method of claim 4 wherein further including receiving third user input causing modification of one or more data transformation steps from the set of data transformation steps.

9. The method of claim 1 wherein the user interface further includes a list interface where the set of data transformation steps is rendered as a list in the list interface.

10. The method of claim 9 wherein the set of data transformation steps rendered in the list interface are ordered according to an order of application of the data transformation steps to the plurality of input records.

11. The method of claim 10 further including receiving third user input to change the order of application of the set of data transformation steps.

12. The method of claim 10 further including interacting with a data transformation step using the list interface to modify the data transformation step.

13. The method of claim 10 further including interacting with a data transformation step using the list interface to remove the data transformation step from the set of data transformation steps.

14. The method of claim 1 wherein the set of data transformation steps includes one or more of a filter data transformation step, an add field data transformation step, and a choose fields data transformation step.

15. The method of claim 1 wherein the set of data transformation steps includes a filter data transformation step.

16. The method of claim 1 wherein causing export of the reusable data processing program includes compiling the set of data transformation steps to form the reusable data processing program.

17. The method of claim 1 wherein causing export of the reusable data processing program includes forming a dataflow graph representation of the set of data transformation steps to form the reusable data processing program.

18. The method of claim 1 further including computing a data profile for the plurality of transformed records and rendering a representation of the data profile in the user interface.

19. The method of claim 1, wherein the second user input is received upon determining that a data profile for the plurality of transformed records is in accordance with a predetermined data profile.

20. The method of claim 19, wherein the predetermined data profile or predetermined profile rule specifies an allowable range for some characteristics of the data profile.

21. The method of claim 1 further including computing a data quality for the plurality of transformed records and rendering a representation of the data quality in the user interface.

22. The method of claim 21 wherein the data quality includes at least one of counts of valid values, invalid values, NULL values, distinct values, unique values, and/or maximum and minimum values.

23. A system for developing a reusable data processing program including a set of data transformation steps by displaying a set of records and iteratively enabling a user to select one or more data transformation steps, iteratively applying the data transformation steps to the records, and iteratively displaying the transformed records, the system including:

a first input for accessing a plurality of input records;

an output for rendering a representation of the plurality of transformed records in a user interface, the plurality of transformed records determined by applying the set of data transformation steps to the plurality of input records;

a second input for receiving first user input as the user manipulates the representation of the plurality of transformed records using the user interface, the first user input including one or more data transformation steps;

one or more processors configured to, for each data transformation step of the one or more data transformation steps, perform the steps of:

adding the data transformation step to the set of data transformation steps, updating the plurality of transformed records, including applying the set of data transformation steps to the plurality of input records, and rendering a representation of the transformed plurality of transformed records in the user interface; and a third input for receiving second user input causing export of the reusable data processing program based at least in part on the set of data transformation steps, the reusable data processing program being applicable to one or more pluralities of records different from the plurality of input records, wherein the user interface includes a tabular interface and the representation of the plurality of transformed records is rendered in the tabular interface, and the tabular interface includes columns associated with fields of the plurality of transformed records, one or more of the columns is a user created column, and the user created column includes an icon indicating the column as user created.

24. A non-transitory computer-readable medium storing instructions for causing a computing system to implement a method for developing a reusable data processing program including a set of data transformation steps by displaying a set of records and iteratively enabling a user to select one or more data transformation steps, iteratively applying the data transformation steps to the records, and iteratively displaying the transformed records, the instructions cause the computing system to:

access a plurality of input records;

render a representation of the plurality of transformed records in a user interface, the plurality of transformed records determined by applying the set of data transformation steps to the plurality of input records;

receive first user input as the user manipulates the representation of the plurality of transformed records using the user interface, the first user input including one or more data transformation steps;

for each data transformation step of the one or more data transformation steps:

add the data transformation step to the set of data transformation steps, update the plurality of transformed records, including applying the set of data transformation steps to the plurality of input records, and render a representation of the transformed plurality of transformed records in the user interface; and receive second user input causing export of the reusable data processing program based at least in part on the set of data transformation steps, the reusable data processing program being applicable to one or more pluralities of records different from the plurality of input records, wherein the user interface includes a tabular interface and the representation of the plurality of transformed records is rendered in the tabular interface, and the tabular interface includes columns associated with fields of the plurality of transformed records, one or more of the columns is a user created column, and the user created column includes an icon indicating the column as user created.

25. A system for developing a reusable data processing program including a set of data transformation steps by displaying a set of records and iteratively enabling a user to select one or more data transformation steps, iteratively applying the data transformation steps to the records, and iteratively displaying the transformed records, the system including:

means for accessing a plurality of input records;

means for rendering a representation of the plurality of transformed records in a user interface, the plurality of transformed records determined by applying the set of data transformation steps to the plurality of input records;

means for receiving first user input as the user manipulates the representation of the plurality of transformed records using the user interface, the first user input including one or more data transformation steps;

means for processing configured to, for each data transformation step of the one or more data transformation steps:

add the data transformation step to the set of data transformation steps, update the plurality of transformed records, including applying the set of data transformation steps to the plurality of input records, and render a representation of the transformed plurality of transformed records in the user interface; and means for receiving second user input causing export of the reusable data processing program based at least in part on the set of data transformation steps, the reusable data processing program being applicable to one or more pluralities of records different from the plurality of input records, wherein the user interface includes a tabular interface and the representation of the plurality of transformed records is rendered in the tabular interface, and the tabular interface includes columns associated with fields of the plurality of transformed records, one or more of the columns is a user created column, and the user created column includes an icon indicating the column as user created.

26. A method for developing a reusable data processing program, and the method including:

accessing a plurality of input records;

rendering a representation of the plurality of input records in one or more user interfaces;

receiving a set of one or more data transformation steps;

applying the set of data transformation steps to the plurality of input records to obtain a plurality of transformed records;

rendering a representation of the plurality of transformed records in the one or more user interfaces;

receiving first user input as the user manipulates the representation of the plurality of transformed records using the one or more user interfaces, the first user input including one or more data transformation steps;

for each data transformation step of the one or more data transformation steps of the first user input:

adding the data transformation step to the set of data transformation steps to update the set of data transformation steps, updating the plurality of transformed records, including applying the updated set of data transformation steps to the plurality of input records to obtain an updated plurality of transformed records, and rendering a representation of the updated plurality of transformed records in the one or more user interfaces; and receiving second user input causing export of the reusable data processing program, said exported program being based at least in part on the updated set of data transformation steps, the reusable data processing program being applicable to one or more pluralities of records different from the plurality of input records, wherein the one or more user interfaces include a tabular interface and the representation of the plurality of transformed records is rendered in the tabular interface, and the tabular interface includes columns associated with fields of the plurality of transformed records, one or more of the columns is a user created column, and the user created column includes an icon indicating the column as user created.

27. The method of claim 1, further comprising determining that a data profile for the plurality of transformed records satisfies a predetermined rule and causing export of the reusable data processing program based on that determination.

28. The method of claim 1, wherein computing a data profile for the plurality of transformed records includes dynamically updating profile data for each transformation applied and rendering the updated profile data together with the transformed records in the user interface.

29. The method of claim 1, wherein causing export of the reusable data processing program includes generating a dataflow graph representation comprising vertices corresponding to the data transformation steps and links representing record flows between the vertices.

* * * * *